No. 674,866.  
M. HOOVER.  
FLY TRAP.  
(Application filed Oct. 24, 1900.)  
Patented May 28, 1901.

(No Model.)

Witnesses  
J. P. Brett  
Clarence Shaw

Inventor  
M. Hoover  
by [signature]  
Attorneys

UNITED STATES PATENT OFFICE.

MARTIN HOOVER, OF REDWOOD, NEW YORK.

FLY-TRAP.

SPECIFICATION forming part of Letters Patent No. 674,866, dated May 28, 1901.

Application filed October 24, 1900. Serial No. 34,153. (No model.)

*To all whom it may concern:*

Be it known that I, MARTIN HOOVER, a citizen of the United States, residing at Redwood, in the county of Jefferson and State of New York, have invented a new and useful Fly-Trap, of which the following is a specification.

This invention relates to improvements in insect-traps, and particularly to traps for flies; and the object is to provide a simple and cheap trap which is convenient and effective in operation.

With the above object in view the invention consists in the novel features of construction hereinafter fully described, particularly pointed out in the claims, and clearly illustrated by the accompanying drawings, in which—

Figure 1:
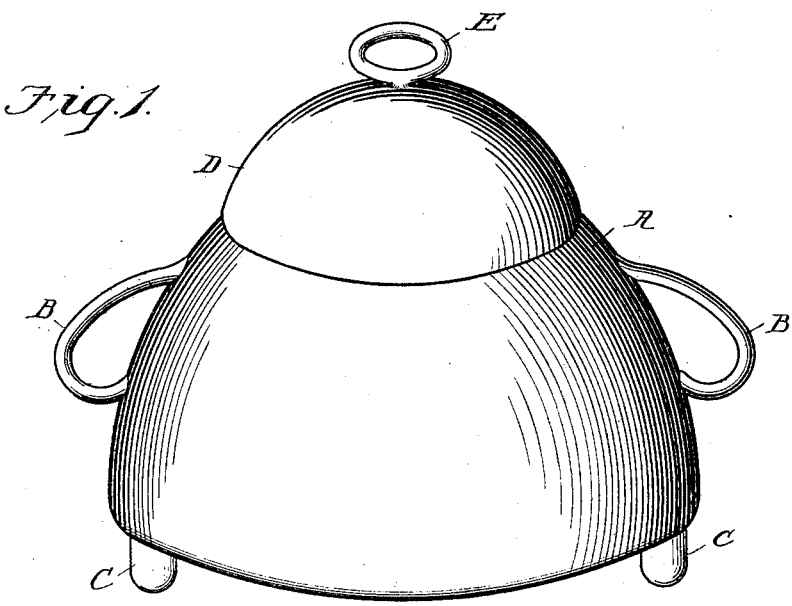
Figure 2:
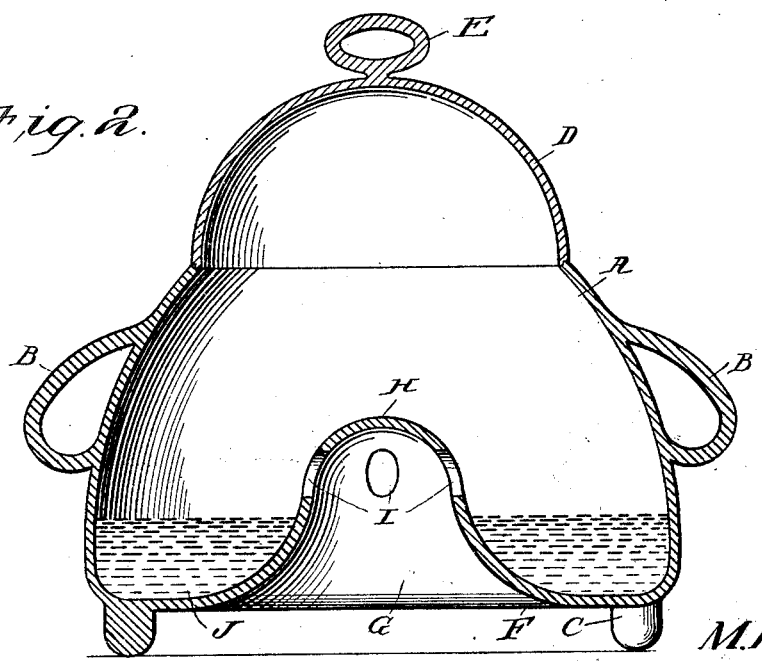

Figure 1 is a perspective view of an insect-trap embodying my invention, and Fig. 2 a vertical sectional view of the same.

Referring now more particularly to the drawings, A designates a vessel of substantially dome shape provided with handles B B, by means of which it may be conveniently lifted and carried from place to place, and with feet C for the purpose of supporting it with its bottom removed from the floor or other support. The vessel is formed with an open upper end and closed by a removable lid D, having a handle E. The bottom wall F of the vessel is bulged upwardly at its center to form an ingress-passage G for the insects, which passage is closed at its inner or upper end, as illustrated at H, and formed below said closed end with a plurality of openings I, establishing communication between the interior of the vessel and said ingress-passage. By the formation of said passage an annular trough J is formed about the same on the interior of the vessel having curved walls and adapted to contain any liquid for the purpose of poisoning or drowning the insects.

A decided advantage is attained by closing the inner end of the inlet-passage, for the reason that the liquid may be poured into the vessel without any liability of the same passing through said passage onto the floor or other support, thus obviating the inconvenience and care attending the pouring of the liquid into those traps where the passage is open at its inner or upper end, in which construction it is practically impossible to place the liquid in the vessel without depositing a portion of the same on the floor or other support upon which the trap is positioned.

Having thus fully described my invention, what I claim as new, and desire to secure by Letters Patent of the United States, is—

1. An insect-trap comprising a vessel having its bottom wall formed with a centrally-disposed inwardly-extending passage having a closed inner end, and formed with an opening in its wall below said closed end communicating with the interior of the vessel at the upper edge of an annular channel formed therein between the walls of the vessel and the passage, substantially as described.

2. An insect-trap comprising a vessel having feet, handles and a filling-opening, and having its bottom wall formed with a centrally-disposed inwardly-extending ingress-passage having a closed inner end and formed with openings in its wall below the closed end communicating with the interior of the vessel, and a removable lid provided with a handle and closing said filling-opening, substantially as described.

MARTIN HOOVER.

Witnesses:
 JOHN CABLE,
 T. H. DONALD.